US006542560B1

(12) United States Patent
Buehrer et al.

(10) Patent No.: US 6,542,560 B1
(45) Date of Patent: Apr. 1, 2003

(54) METHOD OF CHANNEL ESTIMATION AND COMPENSATION BASED THEREON

(75) Inventors: R. Michael Buehrer, Morristown, NJ (US); Shang-Chieh Liu, Dover, NJ (US); Steven P. Nicoloso, Parsippany, NJ (US); Dirck Uptegrove, Mendham, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/296,654

(22) Filed: Apr. 23, 1999

(51) Int. Cl.$^7$ .................................................. H04L 1/00
(52) U.S. Cl. ........................ 375/346; 375/285; 375/316
(58) Field of Search .................................. 375/340, 346, 375/227, 285, 224, 229, 230, 231, 232, 316; 370/252, 330; 329/304

(56) References Cited

U.S. PATENT DOCUMENTS

| 5,265,128 | A | * | 11/1993 | Widmer et al. | 329/318 |
| 5,293,401 | A | * | 3/1994 | Serfaty | 375/231 |
| 5,465,276 | A |  | 11/1995 | Larsson et al. | 375/346 |
| 5,581,580 | A |  | 12/1996 | Lindbom et al. | 375/340 |
| 5,644,599 | A | * | 7/1997 | Hess | 375/267 |
| 5,854,570 | A | * | 12/1998 | Schmidt | 329/304 |
| 5,903,610 | A | * | 5/1999 | Skold et al. | 375/262 |
| 6,226,321 | B1 | * | 5/2001 | Michels et al. | 375/227 |
| 6,269,131 | B1 | * | 7/2001 | Gothe et al. | 375/229 |

FOREIGN PATENT DOCUMENTS

| DE | 19519949 C1 | * | 7/1996 | H04N/5/21 |
| EP | 0496152 A2 |  | 7/1992 | |

OTHER PUBLICATIONS

Bui, Minh–Hung et al. "Channel Estimation Algorithms for DS/BPSK–CDMA Communications System." Seventh IEEE International Symposium on Personal, Indoor and Mobile Communications, vol. 3, Oct. 15–18, 1996, pp. 1145–1149.
Bahai, Ahmad R.S. "Frequency Offset Estimation in Frequency Selective Fading Channels." 1997 IEEE 47$^{th}$ Vehicular Technology Conference, vol. 3, May 4–7, 1997, pp. 1719–1723.
Fukunaga, Kunio et al. "Signal–Discrimination System with Self–Adaptability." System–Computers—Controls, vol. 1, No. 3, May–Jun. 1970, pp. 27–35.
Holtzman, Jack M, et al. "Adaptive Averaging Methodology for Handoffs in Cellular Systems." *IEEE Transactions on Vehicular Technology*; vol. 44, No. 1, Feb. 1995. pp. 59–66.
Bello, Phillip A. "Some Techniques for the Instantaneous Real–Time Measurement of Multipath and Doppler Spread." *IEEE Transactions on Communication Technology*; vol. 13, No. 3, Sep. 1965. pp. 285–292.

* cited by examiner

*Primary Examiner*—Stephen Chin
*Assistant Examiner*—Chieh M. Fan
(74) *Attorney, Agent, or Firm*—Harness, Dickey & Pierce, P.L.C.

(57) ABSTRACT

The method of channel estimation determines linear regression coefficients for N blocks of a first signal component in a received signal on a block-by-block basis, and determines a channel estimate based on the linear regression coefficients for the N blocks. Using the channel estimate, channel distortion in a second signal component of the received signal can be significantly eliminated.

17 Claims, 2 Drawing Sheets

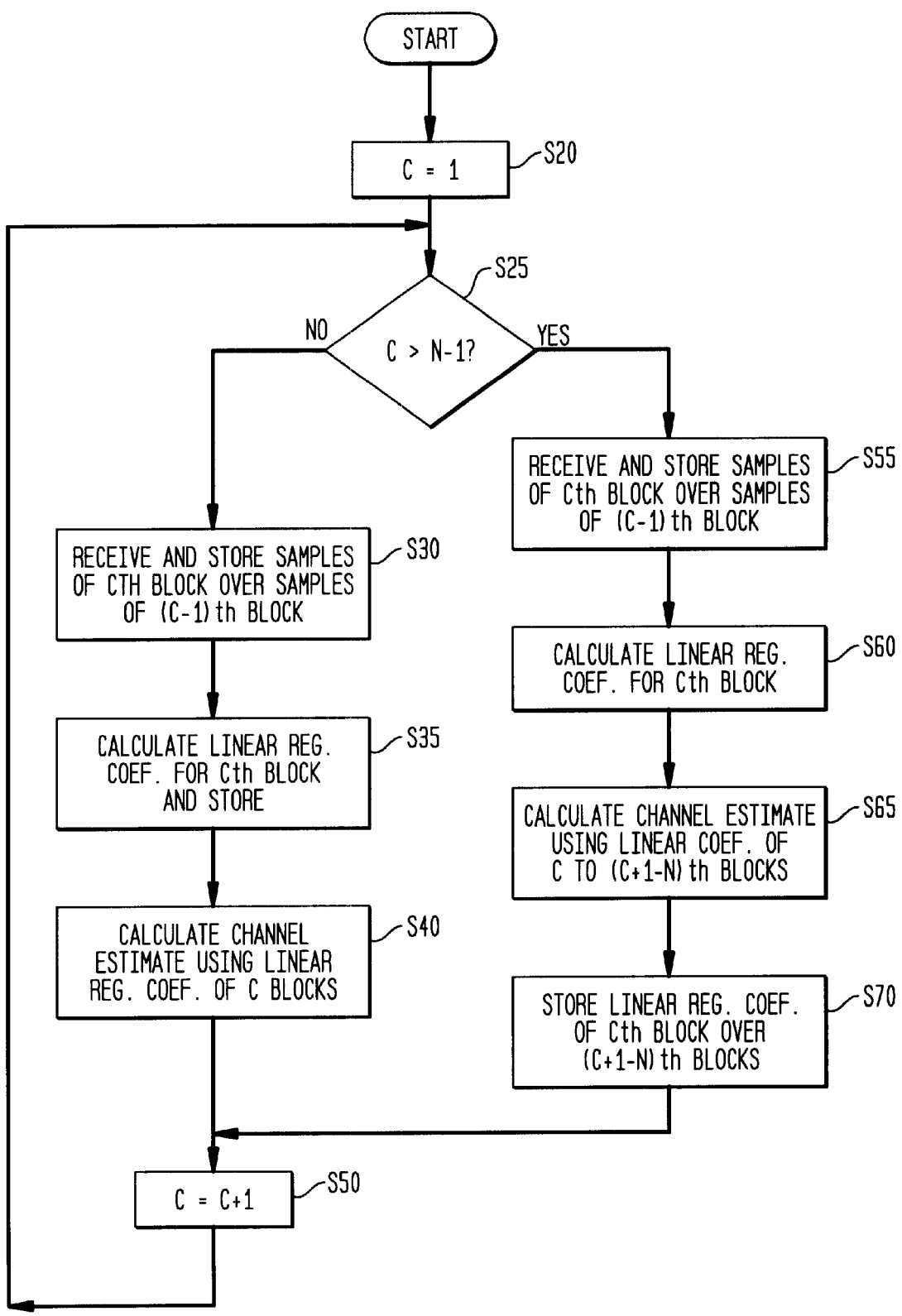

METHOD OF CHANNEL ESTIMATION AND COMPENSATION BASED THEREON

BACKGROUND OF THE INVENTION

1. Field of the Invention

The present invention relates to the field of wireless communication, and more particularly, a method of channel estimation and compensation based thereon.

2. Description of Related Art

In recent decades, many new technologies, such as multi-carrier transmission and smart antenna algorithms, have been proposed to increase the capacity of multi-user wireless communication systems. However, the performance improvement promised by such new technologies is usually limited by the accuracy of channel estimation. Channel estimation is the estimate of the distortion between the transmitter and the receiver of a signal introduced by the physical channel or medium through which the signal was transmitted. Using an estimate of this distortion (i.e., channel estimate), the receiver can remove some of this distortion and improve the accuracy of the received signal. Even a small improvement in channel estimation may introduce significant benefit to, for example, multi-user technologies.

Conventional channel estimation techniques usually assume the physical channel, and therefor the distortion therein, is time-invariant over a finite length sampling window. Channel estimates are assigned by taking the mean value of some observed parameter over the sampling window, and then applying the mean value to eliminate distortion in the received signal. Examples of such conventional techniques include recursive least squares (RLS), least mean squares (LMS), and moving average filtering.

These techniques, however, fail to adapt and produce desirable results in a fast varying environment such as a wireless mobile communication system including moving mobile stations; wherein the physical channel can vary rapidly. Moreover, in code-division multiple access (CDMA) systems, where a low signal-to-noise ratio (SNR) is desired to maximize capacity, high noise further complicates the channel estimation problem because the channel estimation technique must satisfy the conflicting requirements of small window size for time-invariance and long window size for noise immunity.

SUMMARY OF THE INVENTION

The method of channel estimation according to the present invention assumes that the channel changes linearly with time. By performing linear regression on the samples within a sampling window of a first signal component in a received signal, a channel estimate, which varies with a rapidly varying environment, is obtained.

The computational complexity of the linear regression is simplified by determining the linear regression coefficients for blocks of samples. On a block-by-block basis, new samples of a received signal are obtained, and the linear regression coefficients therefor are derived. Using the determined linear regression coefficients for the new block and the stored linear regression coefficients for previous blocks, linear regression coefficients for the entire window are determined.

By applying the complex conjugate of the channel estimate to a second signal component in the received signal, the channel distortion in the second signal component can be significantly reduced.

Furthermore, by estimating the distortion caused by frequency offset (frequency mismatch between the modulator of the transmitter and the demodulator of the receiver) and compensating for the frequency offset prior to performing channel estimation, a much larger sampling window is used to perform the channel estimation. This translates into greater noise immunity.

BRIEF DESCRIPTION OF THE DRAWINGS

The present invention will become more fully understood from the detailed description given hereinbelow and the accompanying drawings which are given by way of illustration only, wherein like reference numerals designate corresponding parts in the various drawings, and wherein:

FIG. 2 illustrates a flow chart of the method for generating a channel estimate according to the present invention.

DETAILED DESCRIPTION OF THE PREFERRED EMBODIMENTS

Figure 1:
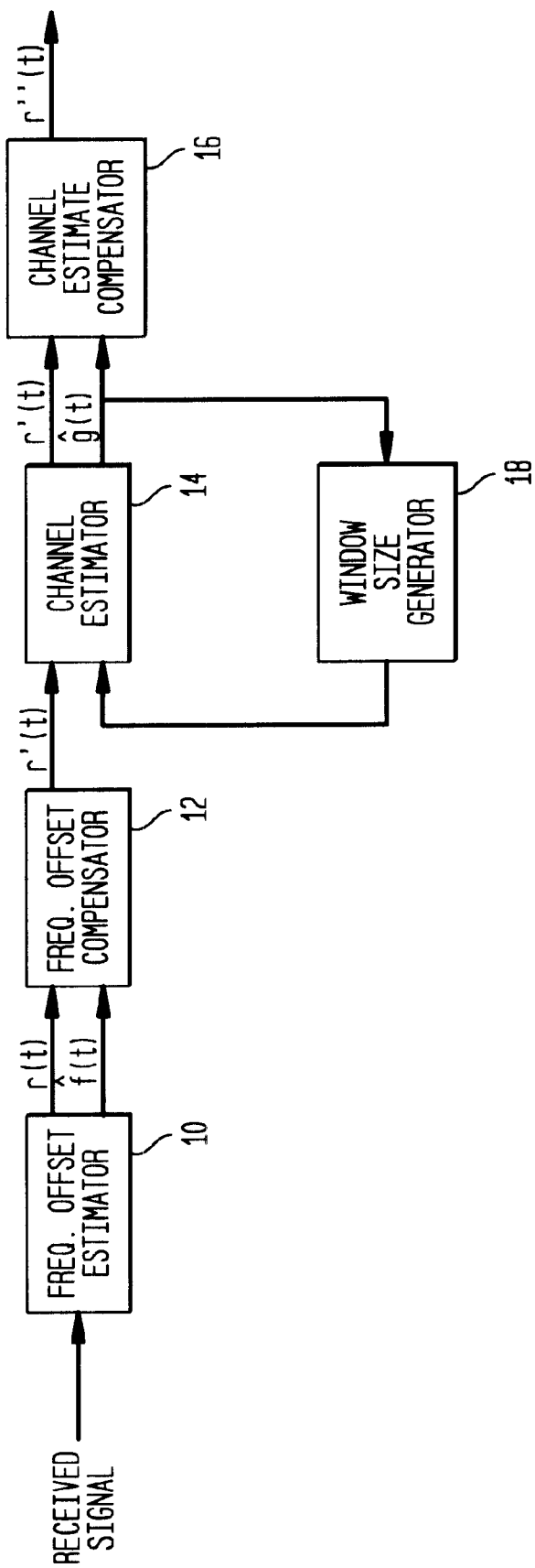
FIG. 1 illustrates the device for generating a channel estimate and performing channel estimate compensation according to the present invention.

FIG. 1 illustrates the device for generating a channel estimate and performing channel estimate compensation according to the present invention. As shown, a received signal is supplied to a frequency offset estimator 10. Using a known signal component in the received signal, the frequency offset estimator 10 estimates the frequency offset of the received signal.

Equation (1) below generically represents the received symbols of a signal component in the received signal.

$$r(t) = s(t) \times f(t) \times g(t) + \text{white noise} \tag{1}$$

where $r(t)$ is the received symbol, $s(t)$ is the transmitted symbol, $f(t)$ is the frequency offset, and $g(t)$ is the channel distortion.

Because the oscillator used to demodulate signals at the receiver will not be in perfect synchronization with the oscillator used to modulate signals at the transmitter, an offset between the two will exist and appear as distortion, called frequency offset, in the received symbol. This distortion appears as a periodic signal over a small sampling window as compared to the channel distortion. The frequency offset estimator 10 generates a frequency offset estimate $\hat{f}(t)$, and supplies the frequency offset estimate $\hat{f}(t)$ and the received symbol $r(t)$ to a frequency offset compensator 12.

The frequency offset compensator 12 uses the estimated frequency offset $\hat{f}(t)$ to compensate for the frequency offset in the received signal and generate compensated received symbols $r'(t)$ in known and unknown signal components of the received signal.

The compensated received symbols $r'(t)$ are received by a channel estimator 14, which generates an estimate, $\hat{g}(t)$, of the channel distortion $g(t)$ using the compensated received symbols $r'(t)$ of the known signal component and a window size. As described in detail below, the channel estimate $\hat{g}(t)$ constitutes linear regression coefficients. The channel estimator 14 supplies the channel estimate $\hat{g}(t)$ and the compensated received symbols $r'(t)$ to a channel estimate compensator 16. The channel estimate compensator 16 uses the channel estimate $\hat{g}(t)$ to compensate for the channel distortion in the compensated received symbols $r'(t)$ of unknown signal components in the received signal.

Preferably, but not essentially, the device further includes a window size generator 18 adaptively generating a window size W based on the linear regression coefficients from the channel estimator 14.

The operation of the present invention will now be described in detail. As mention above, estimates based on the symbols in known signal components of the received signal are used to perform compensation on the known and unknown components of the received signal. Some wireless communication systems like CDMA2000 include known signal components in both uplink (reception by a base station) and downlink (transmission by a base station) communication. In CDMA2000, the pilot signals in the uplink and downlink communication are the known signal component.

Alternatively, a known symbol sequence called a training sequence is periodically inserted into an unknown signal component, and can be used as the known signal component. For example, time-division multiple access (TDMA) systems include such periodic training sequences.

As a further alternative, non-coherent detection of the unknown signal component is performed. Non-coherent detection is estimation of the data symbols without accounting for channel distortion. The result of the non-coherent detection is then treated as the known signal component.

As previously mentioned, the frequency offset appears as a periodic signal, which can be represented by the following equation:

$$f(t)=e^{\wedge}(jwt) \quad (2)$$

where w is the frequency difference between the local oscillator at the demodulator in the receiver compared to the oscillator at the modulator of the transmitter. Consequently, w can be estimated by averaging the phase difference between adjacent symbols over time as shown in equation (3) below:

$$\hat{w} = \left[\sum_{n=1}^{S} phase(a(n\Delta t) \cdot a(n\Delta t - \Delta t)) * \Delta t\right] / S \quad (3)$$

where $a(n\Delta t)$ is the known signal component of the received signal at time $n\Delta t$, $a(n\Delta t-\Delta t)$ is the known signal component of the received signal at time $(n-1)\Delta t$, $\Delta t$ is the time between adjacent symbols, and S is the number of samples used to create the estimate.

The frequency offset estimator 10 estimates w according to equation (3), and using $\hat{w}$ in equation (2) generates the frequency offset estimate $\hat{f}(t)$.

The frequency offset compensator 12 compensates for the frequency offset $\hat{f}(t)$ by applying the conjugate of the frequency offset estimate $\hat{f}(t)$ to the received symbols r(t) of the received signal, and generates the compensated received symbols r'(t) of the received signal. By estimating the frequency offset and compensating therefor, a larger sampling window can be used for performing the channel estimation with the attendant benefit of greater noise immunity.

The channel estimator 14 receives samples of the known signal component on a block-by-block basis, and determines the channel estimate over a number of blocks N equal to a window size W. During the set-up of the wireless communication system incorporating the present invention, a potential range of window sizes is determined based on the expected Doppler frequency range, which is dependent on the speed that mobile stations may move, using any well-known technique. Taking the maximum and minimum window sizes, maximum and minimum numbers of blocks per window are determined according to the equation N=(W/2)^(1/2). An integer value lying between the maximum and minimum number of blocks, in accordance with the designers preference, is selected as the number of blocks per window. Preferably, but not essentially, the number of blocks is chosen such that an integer multiple thereof equals the size of a frame of data specified by the wireless standard according to which the wireless communication system operates. Consequently, besides setting the number of blocks N, this process establishes the initial window size W and the size of a block.

The operation of the channel estimator 14 to generate the channel estimate will now be described with respect to the flow chart illustrated in FIG. 2.

In step S20, a count value C is set to 1, and the channel estimator 14 determines if C is greater than N−1 in step S25. If C is less than N−1, then in step S30 the samples in the next block of samples for the known signal component, the Cth block, are received and stored. These samples are stored over the previously stored block of samples such that the channel estimator 14 only stores one block of samples at a time. It should be understood, that the channel estimator 14 is not limited to storing only one block of samples, but doing so reduces the memory requirements of the channel estimator 14.

In step S35, the channel estimator 14 calculates and stores the linear regression coefficients for the Cth block of samples. Specifically, the channel estimator 14 calculates the mean and slope of a line that minimizes a mean square error of the samples in the Cth block. Next, in step S40, using the stored linear regression coefficients for blocks 1 to C, the channel estimator 14 calculates the channel estimate. Specifically, the channel estimator 14 calculates the mean and slope of a line that minimizes a mean square error of samples in the 1 to C blocks as represented by linear regression coefficients for each block. Instead of using the samples for each block, only the linear regression coefficients are used. Consequently, only the linear regression coefficients, and not the samples, for the 1 to C−1 blocks have to be stored.

After step S40, the count value C is increased by one in step S50, and processing returns to step S25. Once N−1 blocks have been processed and the linear regression coefficients therefor stored, the count value C will exceed N−1. Accordingly, processing will proceed from step S25 to step S55, and with the receipt of the next block of samples, samples for an entire sampling window will have been received.

In step S55, the next block of samples for the known signal component, the Cth block of samples, are received and stored. These samples are stored over the previously stored block of samples such that the channel estimator 14 continues to store only one block of samples at a time. As stated above, the channel estimator 14 is not limited to storing only one block of samples, but doing so reduces the memory requirements of the channel estimator 14.

Then, in step S60, the channel estimator 14 calculates and stores the linear regression coefficients for the Cth block of samples. Specifically, the channel estimator 14 calculates the mean and slope of a line that minimizes a mean square error of the samples in the Cth block. Next, in step S65, using the stored linear regression coefficients for blocks (C+1−N) to C (now a total of N blocks or the size of the sampling window), the channel estimator 14 calculates the channel estimate. Specifically, the channel estimator 14 calculates the mean and slope of a line that minimizes a mean square error of samples in the (C+1−N) to C blocks as represented by the linear regression coefficients for each block. Instead of using the samples for each block, only the linear regression coefficients are used. Consequently, only the linear regression coefficients, and not the samples, for the N−1 blocks have to be stored. This significantly reduces the memory requirements for the channel estimator 14.

Next, in step S70, the linear regression coefficients for the Cth block are stored over the linear regression coefficients for the (C+1−N)th block. After step S70, the count value C is increased by one in step S50, and processing returns to step S25.

Unlike conventional channel estimation techniques, the channel estimation method according to the present invention does not assume a constant channel over an observation window. Instead, the channel is assumed to change linearly with time (i.e., an arbitrary straight line in the complex plane).

Furthermore, by generating the channel estimate through block updated linear regression where only one block at a time is updated to shift the observation or sampling window, the processing delay and computation complexity resulting from a large observation window is significantly reduced compared to using the samples in the observation window themselves. However, it should be understood that instead of using linear regression coefficients, the samples themselves could be used to generate the channel estimate. Of course, such an implementation would require a significantly greater amount of memory.

The channel estimate compensator 16 applies the complex conjugate of the channel estimate ĝ(t) from the channel estimator 14 to the compensated received symbols r'(t) of unknown signal components in the received signal to remove the channel distortion from the compensated received symbol.

In a CDMA2000 wireless system, for example, the unknown signal component could be a traffic channel. In the alternative discussed above involving training sequences, the unknown signal component would be the non-training sequence portion of the received signal. In the further alternative involving non-coherent detection of the received signal, the received signal prior to non-coherent detection in the unknown signal component and the received signal after non-coherent detection is the known signal component.

Next, the operation of the window size generator 18 will be described. In a preferred embodiment, the window size generator 18 determines the sampling window size W based on linear aggression coefficients from the channel estimator 14. However, before the linear regression coefficients have been generated, the window size generator 18 supplies the predetermined window size discussed above to the channel estimator 14. The sampling window (also called the observation window) size is a design parameter, which can be empirically determined to best meet the designer's preferences; and therefor, can be fixed. But, as mentioned, in a preferred embodiment, the sampling window size W is adaptively determined based on linear regression coefficients from the channel estimator 14 according to equation (4) below:

$$W = alpha1 * PI(2*beta/delta)^{1/2} + alpha2 \quad (4)$$

where alpha1 and alpha2 are empirically determined constants that best meet the designer's preferences;

$$beta = \frac{1}{L} \sum_{i=C-L}^{C-1} |k_o(i)|^2;$$

$$delta = \frac{\sum_{i=C-L}^{C-1} [(n^2-1)(k_2(i) + k_1(i-1)) - 2nk_0(i-1)]^2 - 2(n^2-1)(4n^2-1)|k_1(i)|^2}{L - (7n^2-1)(4n^2-1)}$$

$k_0(i)$=mean of the ith block; $k_1(i)$=slope of the ith block; n=size of a block; L=observation interval over which Doppler frequency is assumed constant (a design parameter set according to a designer's preference); and C=block index or count value discussed above.

If the window size determined according to equation (4) exceeds the current window size by the size of a block or is less than the current window size by the size of a block, the window size generator 18 respectively increases or decreases the window size W by a block. Accordingly, the number of blocks N respectively increases or decreases. The new number of blocks N (i.e., the window size) is supplied to the channel estimator 14, and used to generate the channel estimate ĝ(t.

It will be appreciated that the method of determining the window size is not limited to the method discussed above, but that any method could be used.

It should be understood that the method according to the present invention can be implemented by a properly programmed digital signal processor or ASIC having sufficient memory capacity, and that the digital signal processor or ASIC is resident in the receiver of the transmitted signal. Accordingly, the method according to the present invention may be employed by both mobile stations and base stations of a wireless communication system.

We claim:

1. A method of channel estimation, comprising:
   a) storing linear regression coefficients for each of a first to (N−1)th block for N blocks of a first signal component in a received signal, each of said N blocks including a number of samples of said first signal component;
   b) receiving samples in an Nth block of said N blocks;
   c) determining linear regression coefficients for said Nth block using said received samples; and
   d) obtaining a channel estimate based on said linear regression coefficients for said N blocks.

2. The method of claim 1, prior to said step a), further comprising:
   e) compensating for frequency offset in said first signal component.

3. The method of claim 1, wherein said step a) stores, for each of said first to (N−1)th blocks, a slope and a mean of a line, which minimizes a mean square error of samples in a corresponding one of said first to (N−1)th blocks, as said linear regression coefficients of said first to (N−1)th blocks.

4. The method of claim 3, wherein said step c) determines a slope and a mean of a line, which minimizes a mean square error of said received samples in said Nth block, as said linear regression coefficients of said Nth block.

5. The method of claim 4, wherein said step d) obtains a slope and a mean of a line, which minimizes a mean square error of samples in said first to Nth blocks as represented by said linear regression coefficients for said first to Nth blocks, as said channel estimate.

6. The method of claim 1, wherein said step c) determines a slope and a mean of a line, which minimizes a mean square error of said received samples in said Nth block, as said linear regression coefficients of said Nth block.

7. The method of claim 1, wherein said step d) obtains a slope and a mean of a line, which minimizes a mean square error of samples in said first to Nth blocks as represented by said linear regression coefficients for said first to Nth blocks, as said channel estimate.

8. The method of claim 1, wherein said first signal component is a known signal component.

9. The method of claim 8, wherein said known signal component is a pilot signal of a CDMA2000 system.

10. The method of claim 8, wherein said known signal component is a periodic training sequence.

11. The method of claim 1, wherein said first signal component is a non-coherent detection of a data signal.

12. The method of claim 1, further comprising:
  e) determining symbols of a second signal component using said channel estimate.

13. The method of claim 12, wherein said first signal component is a periodic training sequence of a signal segment.

14. The method of claim 13, wherein said second signal component is a non-training sequence portion of said signal segment.

15. The method of claim 12, wherein said first signal component is a signal segment resulting from a non-coherent detection of said first signal component in said received signal, and said second signal component is said received signal.

16. The method of claim 1, further comprising:
  e) adaptively changing a value of N.

17. The method of claim 16, wherein said step e) adaptively changes said value of N based on linear coefficients for at least one of said N blocks.

* * * * *